No. 664,459. Patented Dec. 25, 1900.
J. H. BROWN & W. H. TOBIN, Jr.
OVERHEAD ELECTRIC TROLLEY.
(Application filed July 10, 1900.)
(No Model.) 2 Sheets—Sheet 1.
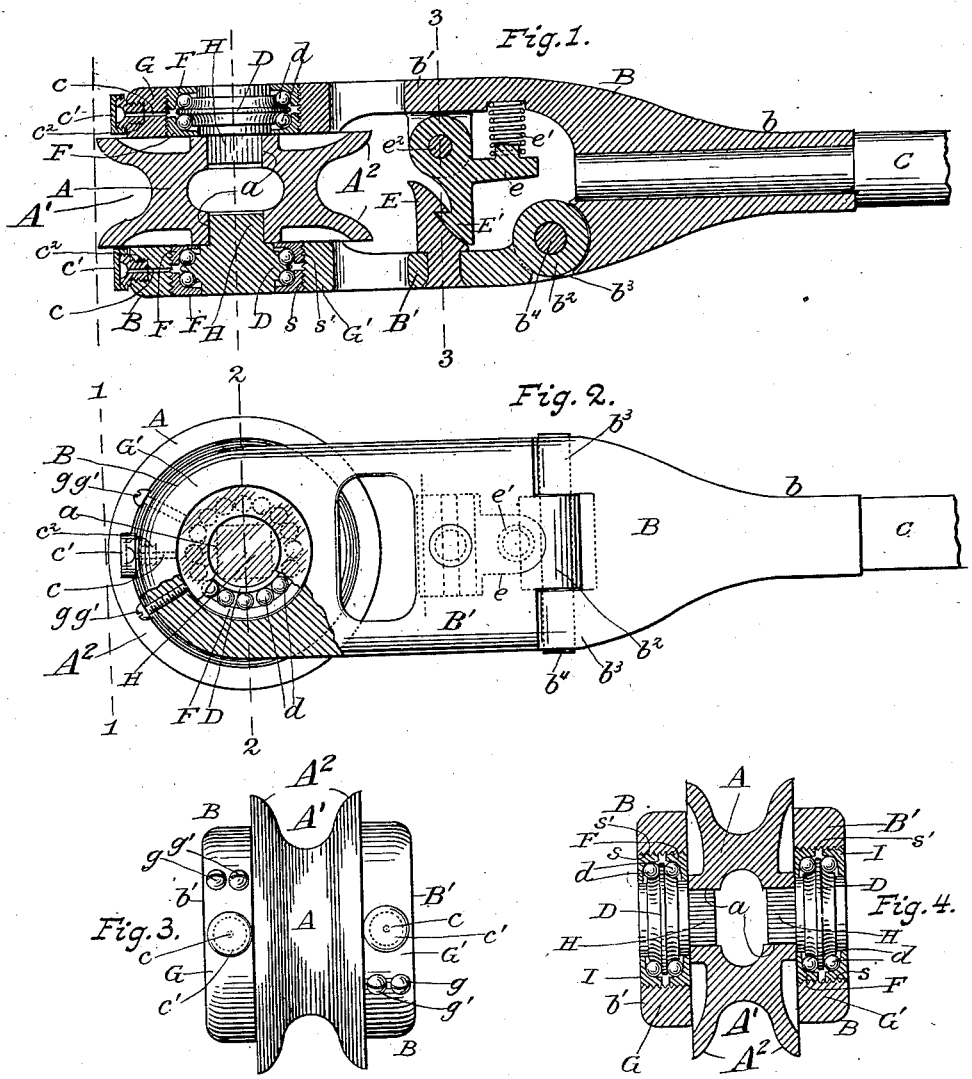
Witnesses,
Charles Seekirk
H. Selkirk
James H. Brown,
William H. Tobin, Jr
Inventors
by Alex. Selkirk,
attorney No. 664,459. Patented Dec. 25, 1900.
J. H. BROWN & W. H. TOBIN, Jr.
OVERHEAD ELECTRIC TROLLEY.
(Application filed July 10, 1900.)
(No Model.) 2 Sheets—Sheet 2.
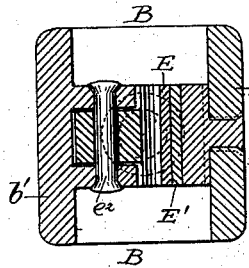
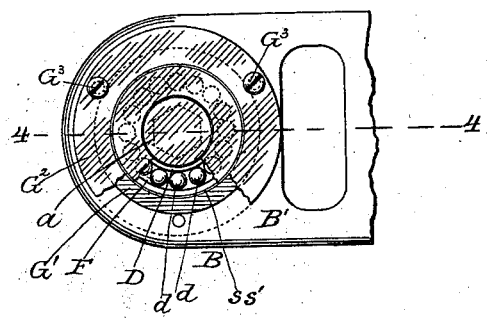
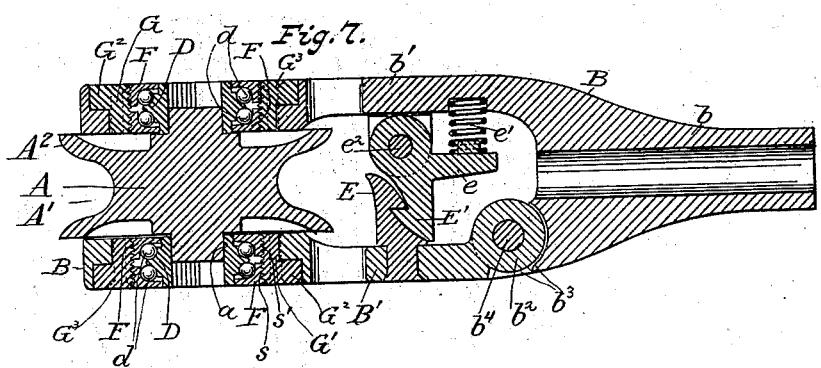

UNITED STATES PATENT OFFICE.

JAMES H. BROWN AND WILLIAM H. TOBIN, JR., OF PITTSFIELD, MASSACHUSETTS.

OVERHEAD ELECTRIC TROLLEY.

SPECIFICATION forming part of Letters Patent No. 664,459, dated December 25, 1900.

Application filed July 10, 1900. Serial No. 23,109. (No model.)

*To all whom it may concern:*

Be it known that we, JAMES H. BROWN and WILLIAM H. TOBIN, Jr., citizens of the United States, and residents of Pittsfield, in the county of Berkshire and State of Massachusetts, have invented new and useful Improvements in Overhead Electric Trolleys, of which the following is a specification.

Our invention relates to improvements in trolley-wheels and their adjuncts for use for overhead electric trolleys; and it consists in certain novel features of construction and arrangements of parts, as herein set forth, and pointed out in the claims.

The objects of our invention are to prevent excessive friction between the trolley-wheel and its "harp" or holder and to provide a simple and efficient means for effecting a quick removal of the trolley-wheel from its harp or holder and a quick replacement of the trolley-wheel and a locking of the same between the side members of the harp or holder.

Other objects and advantages of the invention will be fully understood from the following description and claims when taken in connection with the annexed drawings, in two sheets, forming a part of this specification, in which—

Figure 1 is a horizontal section of the trolley harp or holder and the trolley-wheel and illustrates our invention. Fig. 2 is a side elevation of the same with some of the parts broken for showing hidden parts. Fig. 3 is a view endwise, at line 1 in Fig. 2. Fig. 5 is a section taken at line 3 in Fig. 1. Fig. 6 is an elevation illustrating modifications of some of the parts which may be employed, and Fig. 7 is a section of the same, taken at line 4 in Fig. 6.

Similar letters of reference refer to similar parts throughout the several views.

In the drawings, A is the trolley-wheel, made with any suitable form of periphery and flanges and of any suitable metal.

B is the trolley harp or holder, and C is the trolley-pole.

The trolley-wheel A comprises the annular groove A' and the side flanges $A^2 A^2$, both integral in the wheel, and is provided with a central perforation $a$ of square, oblong, or other form not circular and adapted to receive and securely hold with corresponding engaging devices provided with ball-cones, employed so that the said wheel may revolve on balls and not on a spindle passing through it, as heretofore.

The trolley harp or holder B is shown to comprise the pole socket member $b$, rigid side member $b'$, integral with said socket member $b$, and the hinged member B', having integral with it knuckle $b^2$, pivoted on the socket member $b$ by knuckle $b^3$ and pin $b^4$, as shown in Figs. 1 and 2. This hinged member B' is adapted to be turned at pleasure on its hinge-pin $b^4$ outwardly in the direction of arrow 1 in Fig. 1 and back to the position shown in said Fig. 1, and it may be secured in a fixed position parallel with the rigid side member $b'$, so as not to be accidentally spread outward therefrom, by any suitable means; yet we at present prefer to employ a suitable hook E, rigidly fixed to the hinged member B', and a jointed hook E' for coaction with the said rigid hook, as shown in Fig. 1, this latter hook E' being pivoted in any suitable manner on the fixed or rigid side member $b'$. This jointed hook E' may be held in engagement with the rigid hook by any suitable means; yet we at present prefer to employ a spring suitably arranged in such relation to hook E' and a stationary portion of the harp or holder B as to operate as an elastic support to said hook E' when in engagement with the rigid hook E and until an operator shall at will disengage said hooks. Our preferred elastic supporting device is shown in Fig. 1 and consists of the relatively angular form arm $e$, integral with the body of said hook E' and adapted to serve as a finger-piece for convenience of an operator for pressing the said hook out of engagement at pleasure with the fixed hook E, and the spring $e'$, arranged between said angular arm and the rigid side member B. The pivot $e^2$, on which the hook E' articulates, is preferably in line with the chins of the engaging hooks when holding with each other, while the outer end or nose of said hook E' is extended to a distance forward sufficient to have it abut against the hinged member B' of the harp or holder when suitably closed in place, as shown in Fig. 1.

The members $b'$ and $B'$ of the trolley harp or holder carry each a pair of ball-cups F F and a revolving double ball-cone D and two sets of balls $d\, d$. The ball-cups F F are each independent of the other and adapted to be set inwardly toward the said double ball-cone D or outward in relation to the same at will as may be required for placing new balls or as the wearing of the balls may necessitate. Our preferred means for setting these ball-cups F F inwardly or outwardly are suitable screw-threads $s$, provided on the respective peripheries of said cups and screwing into internal screw-threads $s'$, provided in the circular walls G and G', the former, G, being shown in Fig. 1 to be integral with the rigid side member $b'$ of the trolley-harp and the latter, G', integral with the hinged side member B' of the same. These ball-cups may be fixed from turning in either direction in their respective receiving-walls G G' by any suitable known means; yet we at present prefer to employ set-screws $g$ and $g'$, screwing through said walls, with their ends bearing or adapted to bear against the said ball-cups, as indicated by dotted lines in Fig. 2.

Provision is made for introduction of a lubricant to the balls $d\,d$. Our preferred means for such introduction consists in the duct $c$, communicating from outside to the chambers between the double-ball cone D and the ball-cups F F, in which said balls run. This duct has its outer end closed in a dust-tight manner by a dust-tight screw-threaded cap $c'$, screwing on a suitable screw-threaded stem $c^2$, having through it a perforation which forms a part of said duct $c$, as shown in Fig. 2.

Between the trolley-wheel A and the two double ball-cones D are suitable coupling devices, which operate to hold the former with the latter, so as to revolve together and support the former from said double-ball cones D D. These coupling devices (marked H) are shown in Figs. 1 and 4 to be integral with the double-ball cones D D and in Fig. 6 to be integral with the trolley-wheel. In cross-areas they are in correspondence with the perforation $a$ in the trolley-wheel when integral with the double ball-cones D, as shown in Fig. 1, and in correspondence with the perforations $a'$ made in the double ball-cones D when integral with the trolley-wheel, as shown in Fig. 6. It is evident that a suitable pin, (not shown,) of square, hexagon, oval, or other form, not round, so as to revolve, may be made as a separate piece, nicely fitting in the corresponding central perforation $a$ in the trolley-wheel and in sockets of corresponding form made in the double ball-cones from their inner sides, and may be employed as a substitute for the coupling devices H (shown in Figs. 1, 4, and 6,) for coupling the revolving trolley-wheel with the double ball-cones and for supporting the former from the latter.

For convenience of manufacture and for obviating the necessity of providing a new trolley harp or holder with each set of ball-bearing adjuncts when they are worn out we provide a circular flange $G^2$ with the circular walls G G' and make the latter separate from the rigid side member $b$ and hinged member B' and provide in those members $b'$ and B' a perforation $B^2$, adapted to receive the walls G G' and secure the latter in place and from moving by means of binding-screws $G^3$, as shown in Figs. 6 and 7. In this construction the walls G G', containing the double ball-cone D, ball-cups F F, and bearing-balls $d\, d$, may be readily removed at pleasure from the trolley harp or holder for replacing the worn-out parts, as F, D, and $d\,d$, or any of these, without necessitating the removal of the trolley harp or holder from its pole C.

By our above-described improvements the trolley-wheel is held from becoming excessively worn by friction both at its periphery and its axis of rotation and the wheel is allowed to freely revolve in contact with the wire overhead and without liability of its slipping on the wire in relation to the latter, so that a sliding manner of contact of the former with the latter is prevented and a cutting of the material of the wheel or a flattening of any portion of the periphery is wholly obviated, while a further advantage had is that a quick removal of a worn-out trolley-wheel and a replacing of the same by a new one may be effected and sparking by reason of imperfect contact of parts because of excessive wear, as heretofore, may be wholly prevented.

Having described our invention, what we claim, and desire to secure by Letters Patent, is—

1. In an electric trolley, the combination with a trolley-pole and a revolving trolley-wheel, of a trolley-harp which comprises a rigid side member and a hinged side member which together are adapted to support between them the said trolley-wheel, and an automatic device which is adapted to lock and hold the said hinged side member of the harp in place for coöperation with the rigid side member thereof for supporting the said revolving trolley-wheel, as and for the purposes set forth.

2. In an electric trolley, the combination with a trolley-pole, a trolley-harp comprising a rigid side member which is fixed to said trolley-harp and a second side member jointed on said rigid side member and adapted to be turned in either direction in relation to the latter, and a trolley-wheel provided with the described central perforation $a$, an annular groove A' and annular side flanges $A^2\, A^2$ which are integral in said wheel, of a pair of ball-cups fixed in each of the said side members of said trolley-harp, a double ball-cone between the ball-cups of each pair, bearing-balls between said double ball-cone and the ball-cups of each pair, and coupling devices described, coupling the respective double ball-cones with centrally-perforated portion of the said trolley-wheel, as and for the purposes set forth.

3. In an electric trolley, the combination with a trolley-wheel and a trolley-harp having one of its side members jointed to a fixed part of the same and adapted to be moved in either direction in relation to the trolley-wheel and a device adapted to operate to hold the said jointed side member of the trolley-harp rigidly fixed in place adjacent to the trolley-wheel and be moved at will away from the same, of two sets of ball-bearing adjuncts arranged one set in each said side member of the trolley-harp and comprising in each set two ball-cups a double ball-cone between said two ball-cups, two series of balls and a coupling device between each double ball-cone and the axis of the trolley-wheel, as and for the purposes set forth.

4. In an electric trolley, the combination with a revolving trolley-wheel and a trolley-harp comprising side members $b'$ and $B'$ having in each perforation $B^2$, and removable circular ball-receiving walls G G' secured in said perforations, of a pair of ball-cups and a double ball-cone and two series of bearing-balls and a coupling device between each of said double ball-cones and the axis of the said trolley-wheel, as and for the purposes set forth.

JAMES H. BROWN.
WILLIAM H. TOBIN, JR.

Witnesses:
LINCOLN E. BARTLETT,
JOSEPHUS F. CAFFREY.